(12) United States Patent
Liu et al.

(10) Patent No.: US 11,057,779 B2
(45) Date of Patent: Jul. 6, 2021

(54) METHOD AND APPARATUS FOR TRANSMITTING AND RECEIVING DATA IN A WIRELESS COMMUNICATION SYSTEM

(71) Applicant: Telefonaktiebolaget LM Ericsson (publ), Stockholm (SE)

(72) Inventors: Jinhua Liu, Beijing (CN); Shaohua Li, Beijing (CN); Zhan Zhang, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 21 days.

(21) Appl. No.: 16/317,382

(22) PCT Filed: Jan. 23, 2018

(86) PCT No.: PCT/CN2018/073854
§ 371 (c)(1),
(2) Date: Jan. 11, 2019

(87) PCT Pub. No.: WO2018/171326
PCT Pub. Date: Sep. 27, 2018

(65) Prior Publication Data
US 2020/0120511 A1    Apr. 16, 2020

(30) Foreign Application Priority Data

Mar. 21, 2017   (WO) ................ PCT/CN2017/077497

(51) Int. Cl.
| | |
|---|---|
| *H04W 16/14* | (2009.01) |
| *H04L 5/00* | (2006.01) |
| *H04L 27/26* | (2006.01) |
| *H04W 72/04* | (2009.01) |
| *H04W 72/08* | (2009.01) |

(Continued)

(52) U.S. Cl.
CPC .......... *H04W 16/14* (2013.01); *H04L 5/0048* (2013.01); *H04L 5/0053* (2013.01);
(Continued)

(58) Field of Classification Search
CPC ............. H04W 16/14; H04W 72/0493; H04W 72/082; H04W 72/1289; H04W 72/14;
(Continued)

(56) References Cited

U.S. PATENT DOCUMENTS

| | | | |
|---|---|---|---|
| 2013/0064190 A1 | 3/2013 | Hariharan et al. | |
| 2018/0035459 A1* | 2/2018 | Islam | ............. H04W 74/04 |

(Continued)

FOREIGN PATENT DOCUMENTS

| | | |
|---|---|---|
| CN | 102387507 A | 3/2012 |
| CN | 103874210 A | 6/2014 |
| CN | 106489254 A | 3/2017 |

OTHER PUBLICATIONS

Orfanos, G. et al., "A Centralized MAC Protocol With QOS Support for Wireless LANS," The 18th Annual IEEE International Symposium on Personal, Indoor and Mobile Radio Communications (PIMRC'07), 2007, IEEE, 6 pages.

(Continued)

*Primary Examiner* — Chi Tang P Cheng
(74) *Attorney, Agent, or Firm* — Withrow & Terranova, PLLC

(57) ABSTRACT

Embodiments of the present disclosure provide methods, apparatuses and computer program for data transmission and reception in a wireless communication system. A method in a terminal device comprises: receiving a first indication of a first resource pool to be shared by a first service and a second service; receiving configuration information, the configuration information including a first configuration for transmitting data of the first service using a resource in the first resource pool and/or a second configuration for transmitting data of the second service using a resource in the first resource pool, the second configuration being different from the first configuration; and transmitting the data of the first service and/or the data of the second service based on the first indication and configuration information. Embodiments of the present disclosure may enable data transmission for a (Continued)

service in an efficient way, and/or satisfy QoS requirement for the service.

34 Claims, 8 Drawing Sheets

(51) Int. Cl.
*H04W 72/12* (2009.01)
*H04W 72/14* (2009.01)

(52) U.S. Cl.
CPC ..... *H04L 27/2655* (2013.01); *H04W 72/0493* (2013.01); *H04W 72/082* (2013.01); *H04W 72/1289* (2013.01); *H04W 72/14* (2013.01)

(58) Field of Classification Search
CPC ............. H04L 51/0048; H04L 51/0053; H04L 27/2655
USPC .......................................................... 370/329
See application file for complete search history.

(56) References Cited

U.S. PATENT DOCUMENTS

2019/0268885 A1* 8/2019 Atungsiri ............ H04W 72/042
2020/0029308 A1* 1/2020 Tiirola .............. H04W 72/0453

OTHER PUBLICATIONS

Extended European Search Report for European Patent Application No. 18771056.1, dated Dec. 18, 2019, 8 pages.
Author Unknown, "Technical Specification Group Radio Access Network; Evolved Universal Terrestrial Radio Access (E-UTRA); User Equipment (UE) radio transmission and reception (Release 11)," Technical Specification 36.101, Version 11.0.0, 3GPP Organizational Partners, Mar. 2012, 316 pages.
Author Unknown, "Technical Specification Group Radio Access Network; Evolved Universal Terrestrial Radio Access (E-UTRA); Physical layer procedures (Release 12)," Technical Specification 36.213, Version 12.0.0, 3GPP Organizational Partners, Dec. 2013, 186 pages.
International Search Report and Written Opinion for International Patent Application No. PCT/CN2018/073854, dated Apr. 18, 2018, 9 pages.
Interdigital Communications, "R1-1612646: On multiplexing of eMBB and URLLC data," 3GPP TSG RAN WG1 Meeting #87, Nov. 14-18, 2016, Reno, Nevada, 6 pages.
Examination Report for Canadian Patent Application No. 3056957, dated Oct. 30, 2020, 3 pages.
Examination Report for European Patent Application No. 18771056.1, dated Dec. 8, 2020, 6 pages.

* cited by examiner

METHOD AND APPARATUS FOR TRANSMITTING AND RECEIVING DATA IN A WIRELESS COMMUNICATION SYSTEM

This application is a 35 U.S.C. § 371 national phase filing of International Application No. PCT/CN2018/073854, filed Jan. 23, 2018, which claims the benefit of International Application No. PCT/CN2017/077497, filed Mar. 21, 2017, the disclosures of which are incorporated herein by reference in their entireties.

TECHNICAL FIELD

The non-limiting and example embodiments of the present disclosure generally relate to a technical field of wireless communication, and specifically to methods, apparatuses and computer programs for data transmitting and receiving in a wireless communication system.

BACKGROUND

This section introduces aspects that may facilitate a better understanding of the disclosure. Accordingly, the statements of this section are to be read in this light and are not to be understood as admissions about what is in the prior art or what is not in the prior, art.

In wireless systems, there is a requirement for supporting various services. For example, the fifth generation (5G) wireless communication system being developed by the third generation partnership project (3GPP) is supposed to support, using a common radio access network (RAN), multiple types of services including, for example, enhanced mobile broadband (eMBB), massive machine type communication (mMTC) and ultra-reliable and low latency communication (URLLC). These services require different quality of service (QoS) in terms of delay, data rate and/or packet loss rate. For instance, the URLLC service requires low delay and/or high reliability, while the mMTC service typically requires long battery lifetime without requiring low delay or high data rate and usually causes transmission of small infrequent packets.

To meet requirements of tight delay and extremely low media access control (MAC) block error rate (BLER) for URLLC, a URLLC packet is expected to be transmitted via a short slot with a high quality target (for example, high signal to interference and noise power (SINR) or high received power), and higher layer automatic retransmit request (ARQ) may not be allowed in URLLC. A cost of the short-slot transmission is the increased control channel overhead and possibly uplink (UL)-downlink (DL) switch overhead for a Time Division Duplexing (TDD) system. In contrast, the delay requirement for eMBB is much looser than that for URLLC, and as a result, both long slot duration and higher layer ARQ can be used for eMBB to enhance spectrum efficiency. As another difference, an eMBB service usually causes transmission of large data blocks while an URLLC service usually involves transmission of only small data block. Therefore, a base station (also referred to as a New Radio (NR) NB of gNB) in the 5G wireless communication system has to fulfill deviated QoS requirements for various services.

SUMMARY

In order to provide different services in a wireless communication system in a resource efficient way, methods, apparatuses and computer programs are provided in the present disclosure. It will be appreciated that embodiments of the present disclosure are not limited to a 5G system, but could be more widely applied to any wireless communication system where similar problems exist.

Various embodiments of the present disclosure mainly aim at providing methods, apparatuses and computer programs for data transmitting and receiving. Other features and advantages of embodiments of the present disclosure will be understood from the following description of specific embodiments when read in conjunction with the accompanying drawings, which illustrate, by way of example, the principles of embodiments of the present disclosure.

In a first aspect of the disclosure, there is provided a method in a terminal device. The method comprises: receiving a first indication of a first resource pool to be shared by a first service and a second service; receiving configuration information, the configuration information including a first configuration for transmitting data of the first service using a resource in the first resource pool and/or a second configuration for transmitting data of the second service using a resource in the first resource pool, the second configuration being different from the first configuration; and transmitting the data of the first service and/or the data of the second service based on the first indication and configuration information. In one embodiment, the first service may require lower delay and/or higher reliability than the second service.

In another embodiment, the first and/or second configurations may include one or more of: a parameter for reference signal (RS) configuration, a parameter for code division multiplexing (CDM), a parameter for power control, a parameter for control channel configuration, and a parameter for resource allocation. In some embodiments, the parameter for the CDM may include one or more of: a group of orthogonal covering codes, and a group of scrambling codes. In some embodiments, the parameter for RS configuration may include one or more of: a group of cyclic shifts for the RS, a code sequence for the RS, a transmission pattern for the RS, and an indication of number of antenna ports for the RS. In another embodiment, the parameter for power control may include one or more of: a target received signal power, a compensation factor for path loss, and an indication of transmission power difference between the first service and the second service.

In an embodiment, the first configuration may indicate a first parameter for power control, and the second configuration may indicate a second parameter for power control, and the first parameter for power control may result in a transmission power boost compared to the second parameter for power control.

In another embodiment, the configuration information may indicate a common RS pattern for data transmission of the first service and the second service.

In some embodiments, the method may further comprise: receiving one or more of: a second indication of a second resource pool dedicated for the second service, and a third indication of a third resource pool dedicated for the first service. In a further embodiment, the configuration information may further includes one or more of: a third configuration for transmitting data of the second service using a resource in the second resource pool, the third configuration being different from the second configuration, and a fourth configuration for transmitting data of the first service using a resource in the third resource pool, the fourth configuration being different from the first configuration.

In another embodiment, the first configuration may indicate a first RS pattern, the second configuration may indicate a second RS pattern, the third configuration may indicate a third RS pattern and the fourth configuration may indicate a fourth RS pattern, and the first RS pattern or the second RS pattern may include one or more of: RS included in the third RS pattern, and RS included in the fourth RS pattern.

In some embodiments, the method may further comprise determining a RS pattern for data transmission in the first resource pool based on a RS pattern indicated by the third configuration and a RS pattern indicated by the fourth configuration.

In another embodiment, the method may further comprise receiving, using a resource in the second resource pool, a scheduling grant for data transmission of the first service or the second service using a resource in the first resource pool; and wherein transmitting the data of the first service and/or the data of the second service may comprise transmitting the data of the first service and/or the data of the second service further based on the received scheduling grant.

In still another embodiment, transmitting the data of the first service and/or the data of the second service may comprise blanking data transmission in a resource element occupied by a RS for the first service or the second service in the first resource pool.

In a second aspect of the disclosure, there is provided a method implemented at a network device. The method includes: transmitting a first indication of a first resource pool to be shared by a first service and a second service; transmitting configuration information, the configuration information including a first configuration for transmitting data of the first service using a resource in the first resource pool and/or a second configuration for transmitting data of the second service using a resource in the first resource pool, the second configuration being different from the first configuration; and receiving the data of the first service and/or the data of the second service based on the first indication and the configuration information.

In a third aspect of the disclosure, there is provided a terminal device. The terminal device includes: a first receiving unit, configured to receive a first indication of a first resource pool to be shared by a first service and a second service; a second receiving unit, configured to receive configuration information, the configuration information including a first configuration for transmitting data of the first service using a resource in the first resource pool and/or a second configuration for transmitting data of the second service using a resource in the first resource pool, the second configuration being different from the first configuration; and a transmitting unit, configured to transmit the data of the first service and/or the data of the second service based on the first indication and configuration information In a fourth aspect of the disclosure, there is provided a network device. The network device includes: a first transmitting unit, configured to transmit a first indication of a first resource pool to be shared by a first service and a second service; a second transmitting unit, configured to transmit configuration information, the configuration information including a first configuration for transmitting data of the first service using a resource in the first resource pool and/or a second configuration for transmitting data of the second service using a resource in the first resource pool, the second configuration being different from the first configuration; and a first receiving unit, configured to receive the data of the first service and/or the data of the second service based on the first indication and the configuration information.

In a fifth aspect of the disclosure, there is provided a terminal device. The terminal device includes a processor and a memory, said memory containing instructions executable by said processor, and said processor being configured to cause the network device to perform a method according the first aspect of the present disclosure.

In a sixth aspect of the disclosure, there is provided a network device. The network device includes a processor and a memory, said memory containing instructions executable by said processor and said processor being configured to cause the terminal device to perform a method according the second aspect of the present disclosure.

In a seventh aspect of the disclosure, there is provided a computer program, comprising instructions which, when executed on one or more processors, cause the one or more processors to carry out a method according to the first aspect of the present disclosure.

In an eighth aspect of the disclosure, there is provided a computer program, comprising instructions which, when executed on one or more processors, cause the one or more processors to carry out a method according to the second aspect of the present disclosure.

In a ninth aspect of the disclosure, there is provided an apparatus in a terminal device, the apparatus comprising processing means adapted to perform a method according the first aspect of the present disclosure.

In a tenth aspect of the disclosure, there is provided an apparatus in a network device, the apparatus comprising processing means adapted to perform a method according the second aspect of the present disclosure.

According to various aspects and embodiments as mentioned above, data transmission for a service may be performed in an efficient way, and/or QoS requirement for the service may be satisfied.

BRIEF DESCRIPTION OF THE DRAWINGS

The above and other aspects, features, and benefits of various embodiments of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
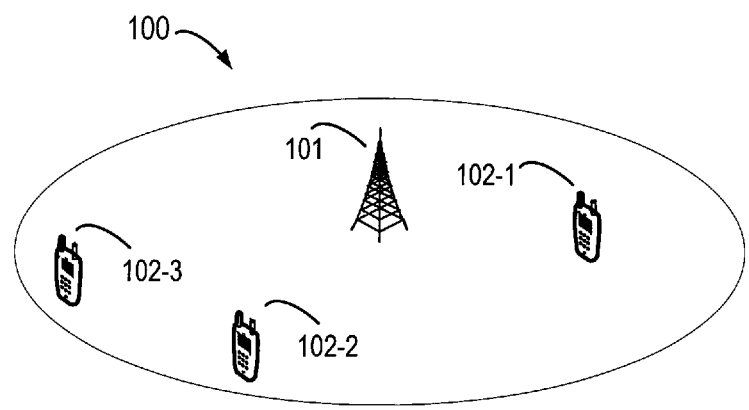
FIG. 1 illustrates an example wireless communication network in which embodiments of the present disclosure may be implemented.

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as Long Term Evolution (LTE), LTE-Advanced (LTE-A), Wideband Code Division Multiple Access (WCDMA), High-Speed Packet Access (HSPA), and so on. Furthermore, the communications between network devices in the wireless communication network may be performed according to any suitable generation communication protocols, including, but not limited to, Global System for Mobile Communications (GSM), Universal Mobile Telecommunications System (UMTS), LTE, and/or other suitable, and/or other suitable the first generation (1G), the second generation (2G), 2.5G, 2.75G, the third generation (3G), the fourth generation (4G), 4.5G, the fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth, depending on the applied terminology and technology.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (for example, MSCs, MMEs), O&M nodes, OSS nodes, SON nodes, positioning nodes (for example, E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably.

As one example, a terminal device may represent a UE configured for communication in accordance with one or more communication standards promulgated by the 3GPP, such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (JOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band interne of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a DL transmission refers to a transmission from the network device to a terminal device, and an UL transmission refers to a transmission in an opposite direction.

FIG. 1 illustrates an example wireless communication network 100 in which embodiments of the disclosure may be implemented. As shown in FIG. 1, the wireless communication network 100 may include one or more network devices, for example network devices 101, which may be in a form of a gNB. It will be appreciated that the network device 101 could also be in a form of a Node B, an eNB, a Base Transceiver Station (BTS), and/or a Base Station Subsystem (BSS), an access point (AP) and the like. The network device 101 may provide radio connectivity to a set of terminal devices or UEs, for example, 102-1, 102-2, and 102-3 (collectively referred to as "terminal device(s) 102) within its coverage. Although network device 101 illustrated in the example wireless communication network may represent a device that includes a particular combination of hardware components, other embodiments may comprise network nodes with different combinations of components. It is to be understood that a network device may comprise any suitable combination of hardware and/or software needed to perform the tasks, features, functions and methods disclosed herein.

In the wireless communication network 100, the network device 101 may need to provide various services to the terminal devices 102. For example, it may provide an eMBB service to the terminal device 102-1, and/or provides an URLLC service to the terminal device 102-2, and/or provides both the eMBB service and the URLLC service to the terminal device 102-3. One straight forward way for providing these different services with satisfying performance may be that the network device 101 reserves a specific radio resource pool for URLLC services requiring low latency and/or high reliability.

Further, due to signaling exchanges for scheduling request (SR) and scheduling grant prior to UL data transmission, there is a larger scheduling delay in UL than in DL which allows direct data transmission, and it has been proposed to use contention based UL data transmission for URLLC to avoid the large delay. However, to support contention based UL data transmission for URLLC traffic, a larger resource pool may need to be reserved in order to reduce collision probability compared to a scheduled URLLC UL data transmission.

Figure 2:
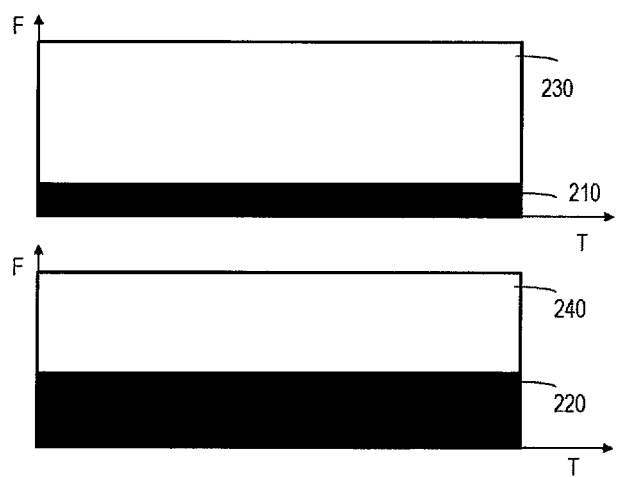
FIG. 2 illustrates an example for resource pools configured for a terminal device.

FIG. 2 shows one example of resource pool allocation for URLLC traffic and eMBB traffic. In this example, DL resource pools 210 and 230 are reserved for URLLC and eMBB respectively, and UL resource pools 220 and 240 are reserved for URLLC and eMBB respectively. Note that the UL resource pool 220 reserved for URLLC traffic is much larger than the DL resource pool 210 reserved for URLLC traffic, since the URLLC data transmission may be fully scheduled in DL while contention based in UL.

In a system supporting grant free access (that is, contention based access) of URLLC traffic, radio resource utilization ratio usually is kept low in order to meet a low collision probability. Even for scheduled data transmission of URLLC, a resource pool may need to be reserved as well, since the system always has to be prepared for transmitting instantaneously generated data for URLLC services within a short slot, in order to satisfy the low latency requirement for the URLLC traffic. Hence, the issue of radio resource efficiency for providing mixed eMBB and URLLC services should be addressed.

Figure 3:
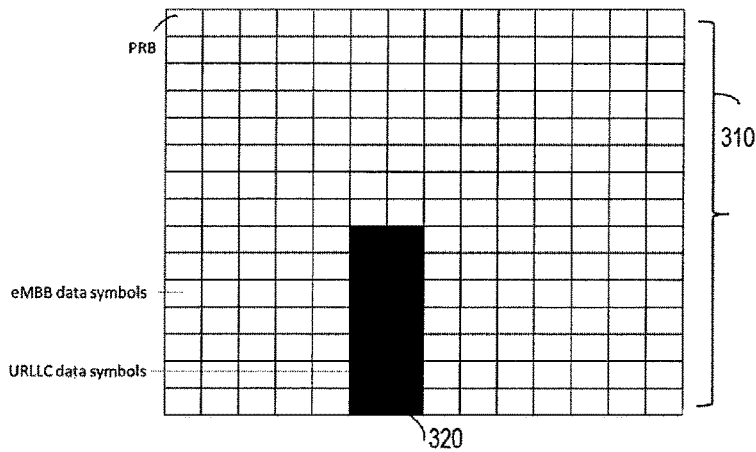
FIG. 3 illustrates schematically resource preemption mechanism.

Currently, an alternative solution being discussed for providing URLLC service is to allow preemption of radio resource used by an ongoing eMBB data transmission for URLLC data transmission. An example for the preemption of radio resource is illustrated in FIG. 3. As shown in FIG. 3, URLLC data symbols may be transmitted in a resource 320 overlapping with a resource 310 for eMBB data transmission. However, if a UE is served by a TDD system, it cannot receive downlink control information (DCI) to stop an ongoing UL transmission when it is in a transmitting (TX) state. That is, an UE cannot stop its eMBB transmission to leave resource for use by URLLC traffic, for example from another UE. In practice, for both TDD and Frequency Division Duplexing (FDD) systems, a gNB cannot stop UL transmission from a UE if the DCI search space occurrence periodicity is large and the delay for DCI transmission and decoding delay is also considerable.

In order to solve at least part of the above problems, methods, apparatuses and computer programs have been proposed herein. Some embodiments of the present disclosure provide a pseudo multi-input multi-output (MIMO) transmission scheme for transmitting data blocks of different services (for example, URLLC and eMBB) using overlapped radio resources where each transmission (i.e. input) in the overlapped radio resource is scheduled via independent pseudo process and the multiplexing occurs randomly via predefined service specific channel coding configurations. Though some embodiments may be described with reference to URLLC service and eMBB service for simplicity, it should be appreciated that embodiments are not limited thereto, and could be applied more widely to other scenarios where similar problems exist.

In some embodiments, URLLC data transmission and eMBB data transmission may be preconfigured to use different codes (for example, Orthogonal Covering Codes (OCC) and/or scrambling code) or different Cyclic Shifts (CS) in the overlapped radio resource.

In some embodiments, in order to satisfy a high reliability requirement for URLLC data transmission, the eMBB data transmission may be scheduled by taking interference control into consideration, for example by setting a low or median SINR target or received power for it. Alternatively or in addition, in some embodiments, the URLLC data transmission is preconfigured to use power boost (or a high SINR target, or a high received power target) to improve transmission performance.

In some further embodiments, at a receiving side, URLLC data may be decoded first, and then eMBB data may be decoded with assistance of decoding results of the URLLC data to improve detection reliability.

With some embodiments, radio resource utilization may be enhanced for providing multiple services using one carrier.

In some embodiments, radio resource may be shared for URLLC traffic and eMBB traffic such that a terminal device may be configured with a large resource pool for performing contention based UL transmission for URLLC, hence the collision ratio can be decreased without obvious resource utilization degradation.

Figure 4:
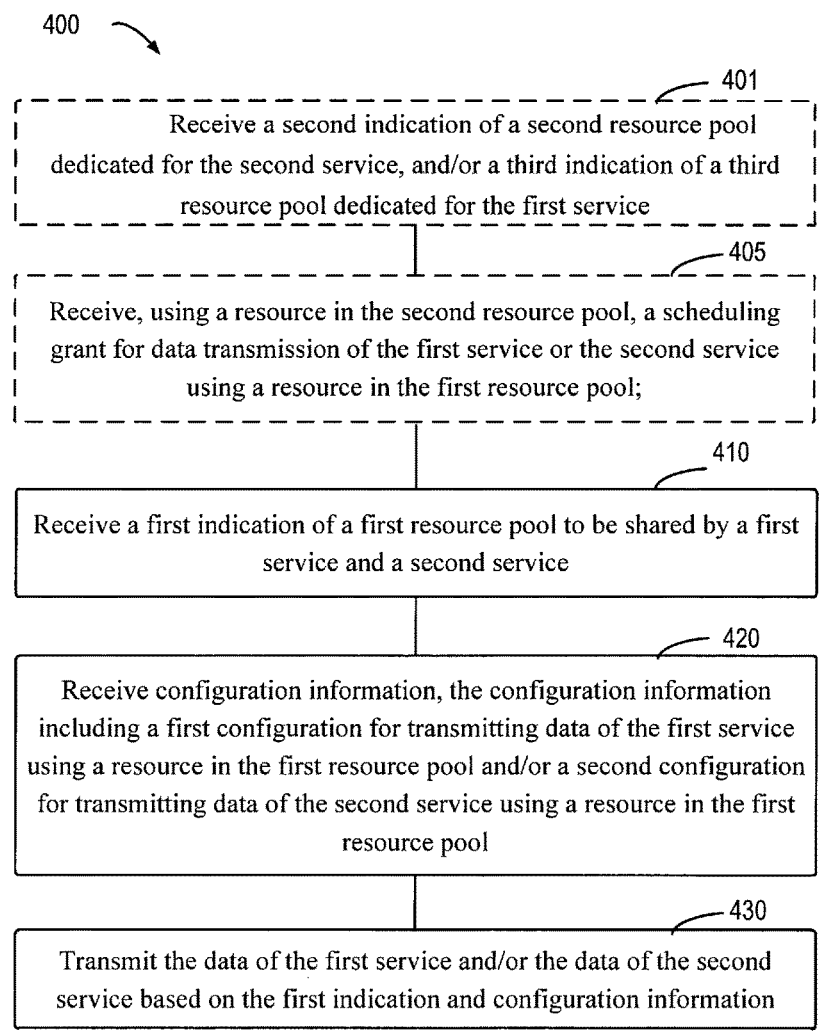
FIG. 4 illustrates a flowchart of a method implemented at a terminal device according to an embodiment of the present disclosure.

Reference is now made to FIG. 4 which shows a flowchart of a method 400 in a terminal device according to an embodiment of the present disclosure, and the terminal device may be, for example, a terminal device 102 shown in FIG. 1. For ease of discussions, the method 400 will be described below with reference to a terminal device 102 and the environment as described with reference to FIG. 1; however, embodiments of the present disclosure are not limited thereto and may be applied more widely in other scenarios where similar problem exists.

As illustrated in FIG. 4, at block 410, the terminal device 102 receives a first indication of a first resource pool to be shared by a first service and a second service. In some embodiments, the first service and the second service have different QoS requirements. For example rather than limitation, the first service may require lower delay and/or higher reliability than the second service. The first service may be, for example but not limited to, URLLC service. As another example, the second service may be eMBB service. For ease of discussions, the method 400 may be described below using URLLC service and eMBB service as an example for the first service and the second service respectively; however, it should be appreciated that embodiments are not limited to the specific services explicitly listed herein.

The first resource pool allows simultaneous transmission of a URLLC data block and eMBB data block transmission in the first resource pool. For example, a URLLC data block may be transmitted in a radio resource (partly) overlapping with a resource for an ongoing eMBB data block transmission. Therefore, radio resource utilization may be enhanced for providing multiple services in one resource pool.

Inventors of the present disclosure have realized that the network may not know whether there will be URLLC packet to be transmitted when the eMBB packet is scheduled, and the transmission of a URLLC packet may occur if there is URLLC packet generated, for example after the eMBB data transmission being scheduled. Therefore, to reduce or avoid performance degradation due to transmission of URLLC and eMBB in an overlapped resource, it is proposed herein that certain pre-configuration may be applied in order to seek satisfying performance of an ongoing eMBB packet transmission as well as the potential URLLC packet transmission. One example is to preconfigure a first set of parameters for URLLC and a second set of parameters for eMBB.

Accordingly, as shown in FIG. 4, at block 420, the terminal device 102 receives configuration information. The configuration information may include one or both of: a first configuration for transmitting data of the first service using a resource in the first resource pool, and a second configuration for transmitting data of the second service using a resource in the first resource pool. In some embodiments, the configuration information may be higher layer configuration information, for example, the configuration information may include one or more parameters semi-statically configured by higher layer.

In some embodiments, the second configuration is different from the first configuration. For example, the first configuration may indicate a first parameter for power control, the second configuration may indicate a second parameter for power control, and the first parameter for power control may result in a transmission power boost compared to the second parameter for power control. In this example, power boost for the URLLC is enabled to meet the high reliability requirement.

However, embodiments are not limited to any specific transmitting or receiving parameter to be included in the first or second configuration. Just for illustration rather than limitation, the first configuration or the second configuration or both of them may include at least one of: a parameter for RS configuration, a parameter for CDM of URLLC and eMBB, a parameter for power control, a parameter for control channel configuration (for example, number of control channel for URLLC and/or eMBB), and a parameter for resource allocation.

In some embodiments, the parameter for CDM indicated by the first or the second configuration may include at least one of: a group of orthogonal covering codes (OCC) and a group of scrambling codes for RS and/or data encoding. For example, URLLC traffic may be configured to use a first OCC for RS masking and a first scrambling code for data masking, and eMBB traffic may be configured to use a second OCC for RS masking and a second scrambling code for data masking. That is, it enables a URLLC data/RS transmission to use a different OCC from an ongoing eMBB data/R transmission according to a pre-configuration.

In an embodiment, the first or the second configuration or both may include the parameter for RS configuration, which may include, for example but not limited to, at least one of: a group of cyclic shifts (CSs) for the RS, a code sequence for the RS, a transmission pattern for the RS, and an indication of antenna ports for the RS. The RS may include, for example but not limited to, one or more of demodulation RS (DMRS), channel state information RS (CSI-RS), and phase tracking RS (PTS). As an example, the parameter for RS configuration may include DMRS sequence and/or CS, and/or DMRS pattern to be used for URLLC or eMBB. A RS pattern indicates resources to be used for carrying RS, and a RS pattern indicating more resource occupied by the RS is also referred to as a denser RS pattern herein. In an embodiment, at block 420, the terminal device 102 may receive a first configuration indicating a RS pattern for URLLC which is denser than that for eMBB, in order to improve channel estimation and demodulation performance for URLLC.

Alternatively or in addition, in an embodiment, the parameter for RS configuration may indicate antenna ports for the RS, for example, which or how many antenna ports are to be used for transmitting the RS.

In 3GPP LTE, power control for physical uplink shared channel (PUSCH) is specified, for example, in TS 36.213 v12.0.0 as equation (1) below:

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{cases} \quad (1)$$

wherein $P_{CMAX,c}(i)$ is the configured UE transmit power defined in TS 36.101 v11.0.0 in subframe i for serving cell c; $M_{PUSCH,c}(i)$ is the bandwidth of the PUSCH resource assignment expressed in number of resource blocks valid for subframe i and serving cell c; $PL_c$ is the downlink path loss estimate calculated in the UE for serving cell c in dB; $\alpha_c(j)$ is the scaling parameters for the path loss; $\Delta_{TF,c}(i)$ and $f_c(i)$ are the other parameters related to modulation and coding schemes (MCS) and previous power control parameters.

In some embodiments, the configuration information received by the terminal device 102 at block 420 may indicate parameter for power control which may include one or more of: a target received signal power, a compensation factor for path loss, and an indication of transmission power difference between the URLLC and the eMBB.

In an example embodiment, the configuration information received by the terminal device 102 at block 420 may set, for eMBB data transmission on the first resource pool, a low or medium SINR/received power target for power control. Alternatively or in addition, in another embodiment, the configuration information received may indicate, for the URLLC transmission on the first resource pool, a high SINR/received power target for power control.

As an example, the configuration information may indicate a small/low $P_{O\_PUSCH,c}(j)$ value for eMBB and/or set a large/high $P_{O\_PUSCH,c}(j)$ value for URLLC for use in the above equation (1).

As another example, the configuration information received by the terminal device 102 at block 420 may indicate a small $\alpha_c(j)$ value for eMBB data transmission on the first resource pool, and/or, a large $\alpha_c(j)$ value for URLLC data transmission on the first resource pool.

In still another embodiment, the configuration information received by the terminal device 102 at block 420 may indicate a set of parameters for eMBB data transmission, and a delta value or scaling factor relative to the set of parameters for URLLC data transmission, so that transmission power used for URLLC is larger than that for eMBB.

In this way, the interference from eMBB data transmission to the URLLC data transmission may be controlled, and thus, there is high probability to decode the URLLC data block correctly even when the URLLC packet transmission collides with the eMBB data transmission. Therefore, with the proposed embodiments, robustness of the URLLC packet transmission may be guaranteed.

Note that the configuration information received by the terminal device 102 at block 420 may be UE-specific or cell-specific. For example, the first configuration and/or second configuration included in the configuration information may be applied to same UE or different UEs.

Still referring to FIG. 4 now. As shown, at block 430, the terminal device 102 transmits the data of the first service (for example, URLLC), or the data of the second service (for example, eMBB), or both, based on the first indication received at block 410 and the configuration information received at block 420. Since the configuration information received at block 420 may include URLLC specific or eMBB specific transmission parameter(s), data transmission for URLLC and/or eMBB can be well controlled, in order to satisfy corresponding QoS requirements.

Figure 5:
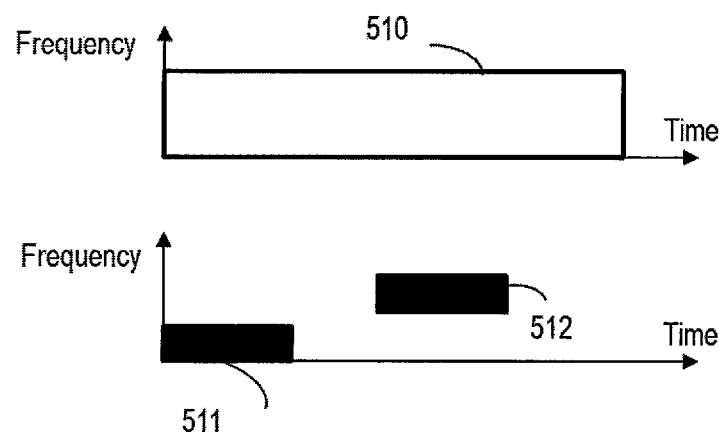
FIG. 5 illustrates an example eMBB and URLLC transmission in overlapped resources according to an embodiment of the present disclosure.

Compared with the preemption method as shown in FIG. 3 (that is to stop ongoing eMBB data transmission if colliding with an URLLC data transmission), in some embodiments, the proposed method can avoid interrupting an ongoing eMBB data transmission. FIG. 5 illustrates one example where eMBB data block is being transmitted using a large resource block 510, and during the eMBB data transmission, URLLC data transmission occurs using parts 511 and 512 of the large resource block 510. The eMBB data transmission and/or the URLLC data transmission in this example may be performed in a similar way to that of block 430 of FIG. 4. That is, the transmission of the eMBB data and/or the URLLC data may be done based on service specific configuration (that is, the second configuration and/or the first configuration included in the configuration information received at block 420). For example, the URLLC transmissions on resource 511 and 512 may use CS and/or OCCs/power control parameters different from that of the ongoing eMBB data transmission using resource 510 according to received configuration information.

In some embodiments, the terminal device 102 may optionally receive, at block 401, a second indication of a second resource pool dedicated for eMBB. That is, only eMBB data transmission can use the second resource pool.

Alternatively, or in addition, in another embodiment, the terminal device 102 may optionally receive, at block 401, a third indication of a third resource pool dedicated for URLLC. That is, only URLLC data transmission can use the third resource pool.

Figure 6:
FIG. 6 illustrates an example of resource pool configuration according to an embodiment of the present disclosure.

FIG. 6 illustrates an example for allocation of resource pools with which pseudo MIMO transmission is allowed between URLLC and eMBB data transmissions. In this example, three resource pools are configured. Pool 601 is shared by both eMBB and URLLC data transmissions; pool 602 is dedicated for eMBB use, while pool 603 is dedicated for URLLC. The URLLC data transmission in the resource pool 601 and 603 may be either scheduled by the gNB (that is scheduled URLLC data transmission) or proactively initiated by the UE (that is contention based URLLC data transmission).

In some embodiments, there is lower interference level and higher transmission reliability in the second resource pool 602 than in the first resource pool 601, since no collision between eMBB transmission and URLLC transmission occurs in the resource pool 602.

In some embodiments where the second resource pool 602 is configured for the terminal device 102, the configuration information received by the terminal device 102 at block 420 may further include a third configuration for transmitting data of the eMBB service using a resource in the second resource pool. In an embodiment, the third configuration (for example for the resource pool 602 in FIG. 6) may be different from the second configuration (for example for the resource pool 601 in FIG. 6).

Likewise, in another embodiment where the third resource pool 603 is configured for the terminal device 102, the configuration information received by the terminal device 102 at block 420 may further include a fourth configuration for transmitting data of the URLLC service using a resource in the third resource pool. The fourth configuration (for example for the resource pool 603 in FIG. 6) may be different from the first configuration (for example for the resource pool 601 in FIG. 6).

The third/fourth configuration enables adapting one or more transmission parameters of the terminal device 102 to different interference level and/or channel status in the dedicated resource pool (that is, pool 602, 603) from that in the share resource pool (that is, 601). That is, the terminal device 102 may receive configuration information for a resource pool depending on sharing status (for example, shared or dedicated) and/or traffic status of the resource pool. As one example, when a resource pool is allocated for the eMBB only, a first set of power control parameters may be configured, while when the resource pool is allocated for sharing between eMBB and URLLC, a second set of power control parameters and a third set of power control parameters may be configured for eMBB traffic and URLLC traffic respectively. When the resource pool is allocated for URLLC only, a fourth set of power control parameters may be configured. Examples of power control parameters described above also apply here. For example one or more parameters shown in Equation (1) may be configured for the terminal device on a per resource pool basis. That is, the first configuration, second configuration, third configuration and the fourth configuration received by the terminal device 102 at block 420 may differ from each other.

As another example, the second configuration and the third configuration received by the terminal device 102 at block 420 may indicate different SINR/receiver power target settings for the same eMBB service in different resource pools. For example, for an eMBB service to be served with both resource pools 601 and 602 shown in FIG. 6, a first high SINR/received power target value may be configured for eMBB data transmission in the dedicated resource pool 602, and a second low SINR/received power target value may be configured for eMBB data transmission in the share resource pool 601 to seek satisfying performance of potential URLLC data transmissions in the same pool 601. While the SINR/received power target for URLLC data in the share resource pool 601 can be set to a higher value to increase the robustness of URLLC data transmissions.

In some embodiments, the second configuration and the third configuration received by the terminal device 102 at block 420 may indicate different RS patterns for eMBB transmission in the first resource pool and the second resource pool respectively.

Likewise, in another example, the first configuration and the fourth configuration may indicate different RS patterns for URLLC transmission in the first resource pool and the third resource pool respectively.

In some embodiments, the first configuration indicates a first RS pattern, the second configuration indicates a second RS pattern, the third configuration indicates a third RS pattern and the fourth configuration indicates a fourth RS pattern, and the first RS pattern or the second RS pattern includes one or more of: RS included in the third RS pattern, and RS included in the fourth RS pattern. As an example rather than limitation, in the share resource pool 601 for URLLC and eMBB, the RS pattern to be used may be derived based on a RS pattern for eMBB (data and/or control) in the dedicated resource pool 602 and a RS pattern for URLLC (data and/or control) in the dedicated resource pool 603. As one example, the RS for any transmission in the share resource pool 601 may be a union or combination of RS for eMBB transmission in the dedicated pool 602 and RS for URLLC transmission in the dedicated pool 603.

In another embodiment, at an optional block not shown in FIG. 4, the terminal device 102 may determine a RS pattern for data transmission in the first resource pool based on a RS pattern indicated by the third configuration and a RS pattern indicated by the fourth configuration. In this example, it is unnecessary for the configuration information received by the terminal device 102 at block 420 to indicate explicitly a RS pattern to be used in the first resource pool.

Figure 7A:
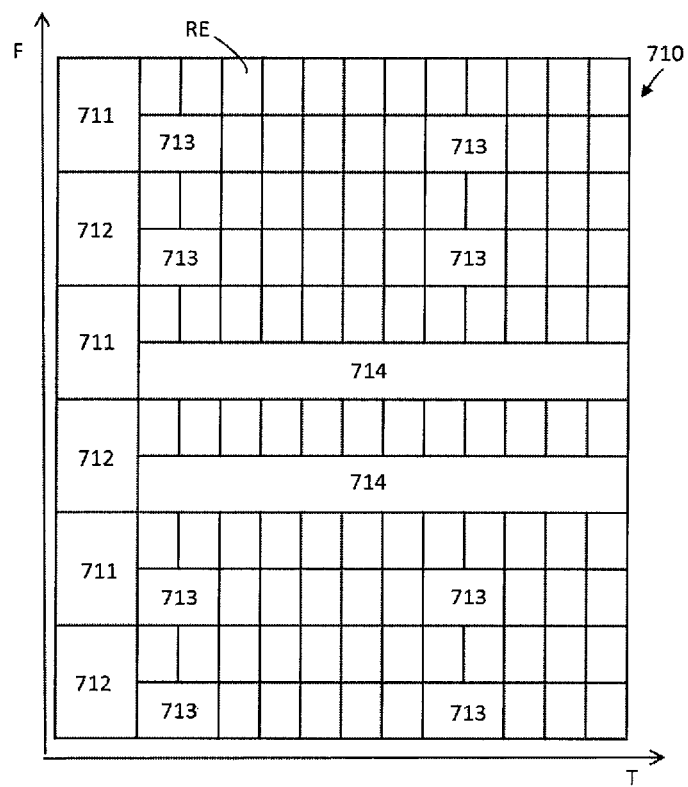
FIGS. 7A-7C illustrate an example of RS patterns for different resource pools according to an embodiment of the present disclosure.
Figure 7B:
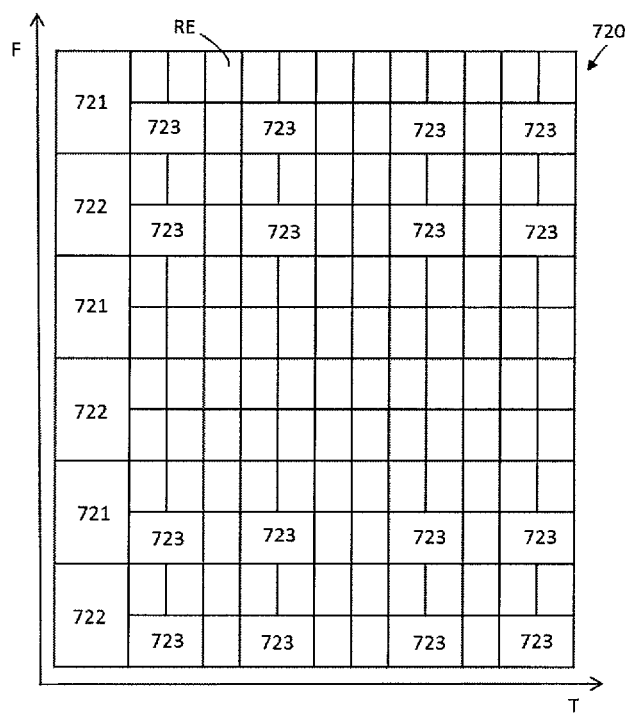
Figure 7C:
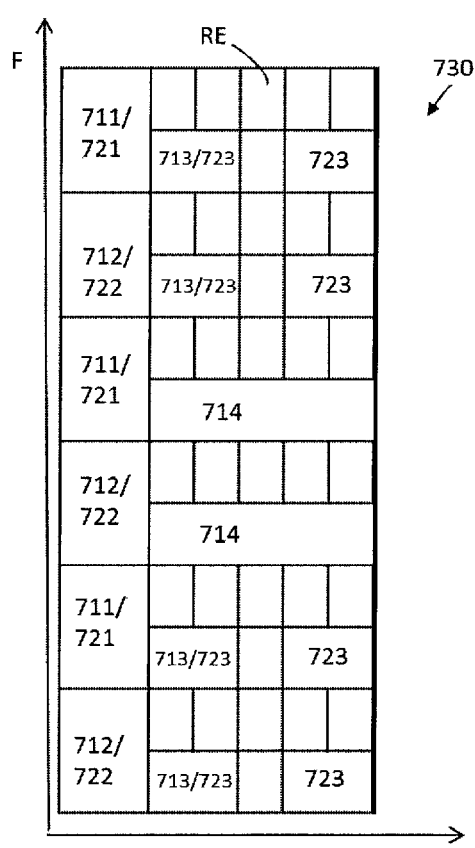

Some examples of RS patterns for different resource pools are shown in FIGS. 7A-7C. FIG. 7A illustrates a RS pattern 710 for eMBB transmission in the dedicated resource pool 602, and the RS pattern 710 indicates resources for: DMRS 712 for control 711, DMRS 713 for data, and PTS 714. It should be understood that in another embodiment, the RS pattern may indicate resource for more or less or different RS. Likewise, a RS pattern 720 for URLLC transmission in the dedicated resource pool 603 is shown in FIG. 7B and the RS pattern indicates resources for: DMRS 722 for control 721 and DMRS 723 for data. A RS pattern 730 for URLLC/eMBB transmission in the share resource pool 601 is shown in FIG. 7C. In this example, when eMBB is transmitted in the share resource pool 601, besides the RS designed for eMBB (that is, RS shown in 710 of FIG. 7A), the RS designed for URLLC (that is, RS shown in 720 of FIG. 7B) is also transmitted for improving eMBB demodulation. Likewise, when URLLC is transmitted in the share resource pool 601, besides the RS designed for URLLC (that is, RS in 720 of FIG. 7B), the RS designed for eMBB demodulation shown in 710 of FIG. 7A is also transmitted and used for URLLC decoding. As shown in FIG. 7C, in this example, when RS 723 for URLLC data and RS 713 for eMBB data collide in same resource, some mechanism, such as CDM via OCC or CSs, may be used to keep the orthogonality between URLLC RS and eMBB RS. That is, if a resource element (RE) for RS of one service collides with RE for RS of another service, some mechanism, such as CDM via OCC, may be used to keep the orthogonality between RSs.

As another example, if a RE for data transmission of a service (for example, eMBB) collides with RE for RS transmission of another service (for example, URLLC), the colliding RE shall not be used for the data transmission to avoid interference to the RS transmission. That is, at block 430 of FIG. 4, when transmitting the data of the first service and/or the data of the second service, the terminal device 102 may blank data transmission in a RE occupied by a RS for the first service or the second service in the first resource pool. In the example shown in FIG. 7C, the REs 723 may not be used for eMBB data transmission, since it overlaps with URLLC RS transmission. The REs 714 may not be used for URLLC data transmission, since the PTS of eMBB are transmitted in these REs.

As another example, in addition to the RS designed for eMBB transmission and the RS designed for URLLC transmission, more RS may be added to the share resource pool to guarantee robust performance of the transmission on the share resource pool.

Now referring back to FIG. 4. In another embodiment, the configuration information received by the terminal device at block 420 may indicate a common RS pattern for data transmission of the first service and the second service. That is, eMBB and URLLC may adopt same DMRS pattern in the share resource pool. For instance, the URLLC DMRS pattern for URLLC may be used for both eMBB data transmission and URLLC data transmission. In this case, different OCC and or CSs are applied for the DMRS of eMBB and the DMRS of URLLC respectively to provide the orthogonality for channel estimation.

As described above, in some embodiments, the configuration information received by the terminal device 102 at block 420 may include service specific configuration for the share resource pool, and/or, resource pool specific configuration. With the configuration information, the terminal device 102 may transmit in a share resource pool or a dedicated resource pool. In an embodiment, the terminal device 102 may transmit eMBB data in the eMBB dedicated resource pool based on the second indication received at block 401 and the third configuration included in the configuration information received at block 420.

Since a dedicated resource pool may provide better performance than a share resource pool, in some embodiments, important control signaling may optionally be received by the terminal device in the dedicated resource pool. As an example, at block 405, the terminal device 102 may receive/transmit, in a resource in the second resource pool (for example, the eMBB dedicated resource pool 602 in FIG. 6), a scheduling grant for data transmission of the first service or the second service in the first share resource pool (for example, pool 601 in FIG. 6); and in this example, the terminal device 102 may transmit, at block 430, data of the first service and/or data of the second service further based on the scheduling grant.

Figure 8A:
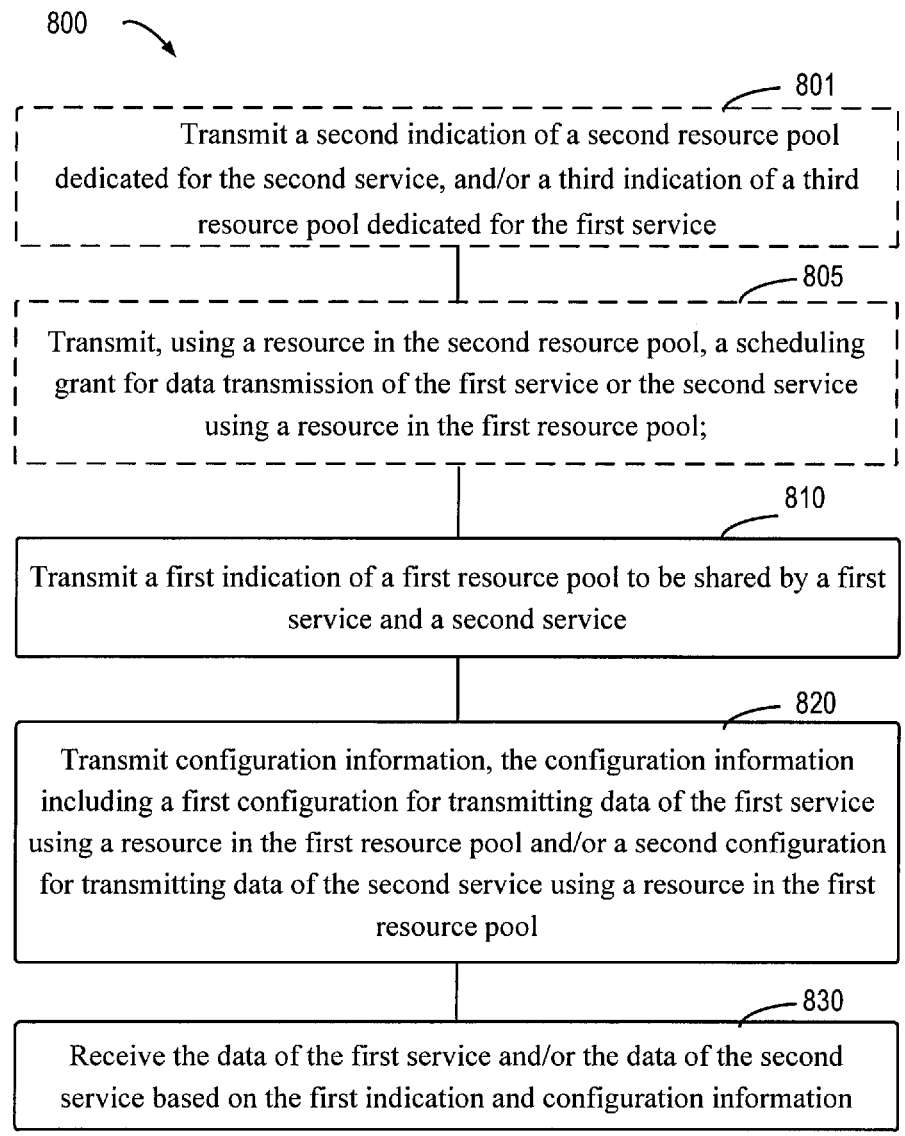
FIGS. 8A-8B illustrate flowcharts of a method implemented at a network device according to an embodiment of the present disclosure.

Reference is now made to FIG. 8A which shows a flowchart of a method 800 in a network device according to an embodiment of the present disclosure, for example, the network device 101 shown in FIG. 1. For ease of discussions, the method 800 will be described below with reference to the network device 101 and the environment as described with reference to FIG. 1; however, embodiments of the present disclosure are not limited thereto and may be applied more widely in other scenarios where similar problem exists.

As illustrated in FIG. 8A, at block 810, the network device 101 transmits a first indication of a first resource pool to be shared by a first service and a second service. Descriptions related to the first service and the second service provided with reference to method 400 also apply here, and details will not be repeated. For example, as described with reference to method 400, the first service may require lower delay and/or higher reliability than the second service. For ease of discussion, in the following description, URLLC and eMBB will be used as an example for the first service and the second service respectively; however, embodiments are not limited thereto.

At block 820, the network device 101 transmits configuration information, for example, to the terminal device 102 in FIG. 1. The configuration may include service specific configuration for data transmission in the first resource pool. For example, the configuration information may include a first configuration for transmitting URLLC data using a resource in the first resource pool, or a second configuration for transmitting eMBB data using a resource in the first resource pool, or both. In an embodiment, the second configuration may be different from the first configuration. In another embodiment, the configuration information may be transmitted by the network device at block 820 via a higher layer signaling. In an embodiment, the configuration information may be same as that received by the terminal device 102 at block 420 using method 400, and therefore, descriptions with respect to the configuration information provided with reference to method 400 also apply here and details will not be repeated. Just as an example, the first configuration and/or the second configuration included in the configuration information may indicate at least one of: a parameter for RS configuration, a parameter for CDM of the URLLC and the eMBB data transmission, a parameter for power control, a parameter for control channel configuration and a parameter for resource allocation. Descriptions provided with reference to method 400 with respect to service specific configuration on power control, RS pattern, CDM and resource allocation also apply here.

At block 830, the network device 101 receives the URLLC data and/or the eMBB data based on the first indication and the configuration information. In an embodiment, at block 830, the network device 101 may decode the data of URLLC firstly and decode the data of eMBB based on decoding result of the URLLC data.

Figure 8B:
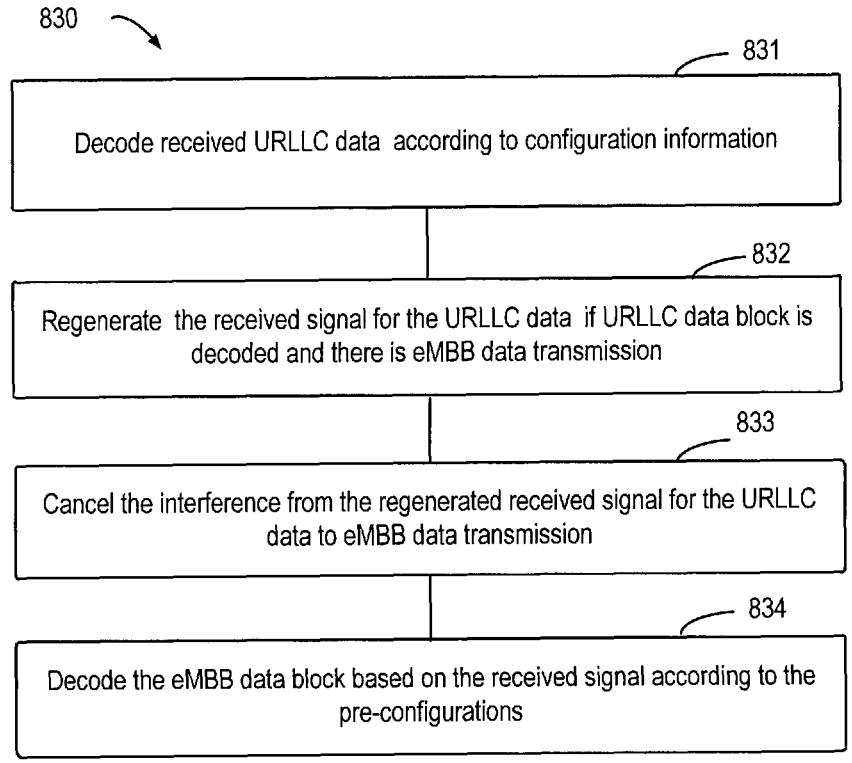

An example of the decoding procedure adopted at block 830 is shown in FIG. 8B. Since the URLLC data transmission may be provided with more protection/redundancy than eMBB data in possible collisions, there is higher probability for decoding the URLLC data correctly. In this example, at block 831, the network device 101 decodes URLLC data block based on the configuration information transmitted at block 820. After the URLLC data block decoding, if there is overlapping eMBB transmission, the URLLC data may cause interference to the eMBB transmission, and the network device 101 regenerates the received signal for the URLLC data at block 832, and cancels interference caused by the regenerated signal for the URLLC data to the eMBB data transmission at block 833. At block 834, the network device 101 further decodes the eMBB data block transmission based on the configuration information transmitted at block 820.

Now referring back to FIG. 8A. In an embodiment, besides the first share resource pool, the network device 101 may configure one or more dedicated resource pool for a specific service. For example, at block 801, the network device 101 may transmit, to the terminal device 102, a second indication of a second resource pool dedicated for eMBB, or a third indication of a third resource pool dedicated for URLLC, or both.

Considering that channel/interference/status may be different in the share resource pool and the dedicated resource pool(s), in some embodiments, the network device 101 may configure resource pool specific transmission/receiving parameters for the terminal device 102. As an example, the configuration information transmitted by the network device at block 820 may further include one or more of: a third configuration for transmitting data of the second service using a resource in the second resource pool, and a fourth configuration for transmitting data of the first service using a resource in the third resource pool. In an embodiment, the fourth configuration may be different from the first configuration, and/or, the third configuration may be different from the second configuration. This embodiment enables the network device 101 to control some transmission parameters for the terminal device 102 on a per resource pool basis. Embodiments are not limited to any specific parameters to be controlled by the network device 101 via the configuration information transmitted at block 820, and an example for the transmission parameter may be RS pattern.

In some embodiments, for a terminal device 102 with eMBB service, the network device 101 may apply separate link control loops for the eMBB data transmissions in the first resource pool and the second resource pool, including respective MCS selection, respective close loop power control, and/or, respective out loop power control and the like.

Alternatively, or in addition, in an embodiment, cross-pool scheduling can be applied for eMBB data transmission (and/or URLLC data transmission). That is, at block 805, the network device 101 may transmit, in a resource from the second resource pool, a scheduling grant (for example, in a form of downlink control information (DCI)) for eMBB/URLLC data transmission using a resource from the first resource pool. The scheduling grant, for example DCI, transmitted in the second resource pool for eMBB data transmissions in the first resource pool and the second resource pool may help to avoid possible quality degradation of the DCI due to the possible interference from the URLLC data transmission. Accordingly, at block 830, the network device 101 receives the eMBB and/or URLLC data transmission further based on the scheduling grant.

In another embodiment, when the network device 101 configures both the first resource pool and the second resource pool for the terminal device 102, it may allocate a radio resource from the non-shared (dedicated) resource pool firstly before allocating a radio resource from the share radio resource pool for data transmission from the terminal device 102. For example, it may schedule eMBB data transmission in the first resource pool only when there is no resource available in the second resource pool. This example may reduce collision and improve performance of data transmission.

With some of the embodiments described above, pseudo MIMO transmission is enabled. It should be understood that both multi-user MIMO (MU-MIMO) transmission (for example, eMBB data transmission from UE 102-1 of FIG. 1 and URLLC data transmission from UE 102-2 of FIG. 1) and single-user MIMO (SU-MIMO) transmission (for example, eMBB data transmission and URLLC data transmission from same UE 102-3 of FIG. 1) is allowed.

Figure 9:
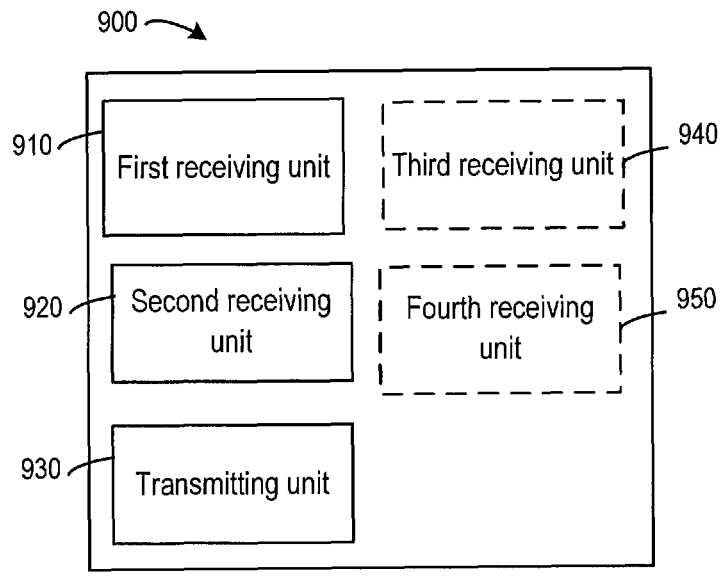
FIG. 9 illustrates a schematic block diagram of an apparatus implemented as/in a terminal device according to an embodiment of the present disclosure.

FIG. 9 illustrates a schematic block diagram of an apparatus 900 in a wireless communication network (for example, the wireless communication network 100 shown in FIG. 1). The apparatus may be implemented as/in a terminal device (for example, the terminal device 102) shown in FIG. 1. The apparatus 900 is operable to carry out the example method 400 described with reference to FIGS. 4-7 and possibly any other processes or methods. It is also to be understood that the method 400 is not necessarily carried out by the apparatus 900. At least some operations of the method 400 can be performed by one or more other entities.

As illustrated in FIG. 9, the apparatus 900 includes a first receiving unit 910, a second receiving unit 920, and a transmitting unit 930. The first receiving unit 910 is configured to receive a first indication of a first resource pool to be shared by a first service and a second service; the second receiving unit 920 is configured to receive configuration information, the configuration information including a first configuration for transmitting data of the first service using a resource in the first resource pool, or a second configuration for transmitting data of the second service using a resource in the first resource pool, or both. In an embodiment, the second configuration may be different from the first configuration. The transmitting unit 930 is configured to transmit the data of the first service, or the data of the second service, or both based on the first indication and the higher layer configuration information.

In an embodiment, the apparatus 900 may further include a third receiving unit 940, and/or a fourth receiving unit 950. The third resource unit 940 is configured to receive one or more of: a second indication of a second resource pool dedicated for the second service and a third indication of a third resource pool dedicated for the first service. The fourth receiving unit 950 is configured to receive, in a resource in the second resource pool, a scheduling grant for data transmission of the first service or the second service using a resource in the first resource pool, or a scheduling grant for data transmission of the first service using a resource in the third resource pool. The transmitting unit 930 may be configured to transmit one of the data of the first service and the data of the second service further based on the scheduling grant.

In an embodiment, the first receiving unit 910, the second receiving unit 920, the transmitting unit 930, the third receiving unit 940, and the fourth receiving unit 950 may be configured to perform the operations of blocks 410-430, 401 and 405 of FIG. 4 respectively, and therefore relevant descriptions provided with reference to method 400 and FIG. 4 also apply here and details will not be repeated.

Figure 10:
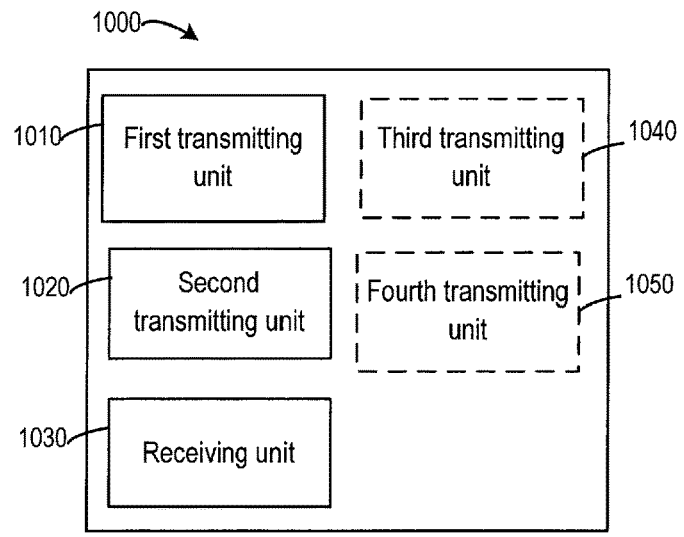
FIG. 10 illustrates a schematic block diagram of an apparatus 1000 implemented as/in a network device according to an embodiment of the present disclosure.

FIG. 10 illustrates a schematic block diagram of an apparatus 1000 in a wireless communication network (for example, the wireless communication network 100 shown in FIG. 1). The apparatus may be implemented as/in a network device (for example, the network device 101) shown in FIG. 1. The apparatus 1000 is operable to carry out the example method 800 described with reference to FIG. 8 and possibly any other processes or methods. It is also to be understood that the method 800 is not necessarily carried out by the apparatus 1000. At least some operations of the method 800 can be performed by one or more other entities.

As illustrated in FIG. 10, the apparatus 1000 includes a first transmitting unit 1010, a second transmitting unit 1020, and a receiving unit 1030. The first transmitting unit 1010 is configured to transmit a first indication of a first resource pool to be shared by a first service and a second service. The second transmitting unit 1020 is configured to transmit configuration information, the configuration information including a first configuration for transmitting data of the first service using a resource in the first resource pool, or a second configuration for transmitting data of the second service using a resource in the first resource pool, or both. The second configuration may be different from the first configuration. The receiving unit 1030 is configured to receive the data of the first service, or the data of the second service, or both based on the first indication and the higher layer configuration information.

In an embodiment, the apparatus 1000 may further include a third transmitting unit 1040, and/or a fourth transmitting unit 1050. The third transmitting 1040 is configured to transmit one or more of: a second indication of a second resource pool dedicated for the second service, and a third indication of a third resource pool dedicated for the first service. The fourth transmitting unit 1050 is configured to transmit, in a resource in the second resource pool, a scheduling grant for data transmission of the first service or the second service using a resource in the first resource pool, or a scheduling grant for data transmission of the first service using a resource in the third resource pool. The receiving unit 1030 may be configured to receive the data of the first service and/or the data of the second service further based on the scheduling grant.

In an embodiment, the first transmitting unit 1010, the second transmitting unit 1020, the receiving unit 1030, the third transmitting unit 1040, and the fourth transmitting unit 1050 may be configured to perform the operations of blocks 810-830, 801 and 805 of FIG. 8 respectively, and therefore relevant descriptions provided with reference to method 800 and FIG. 8 also apply here and details will not be repeated.

Figure 11:
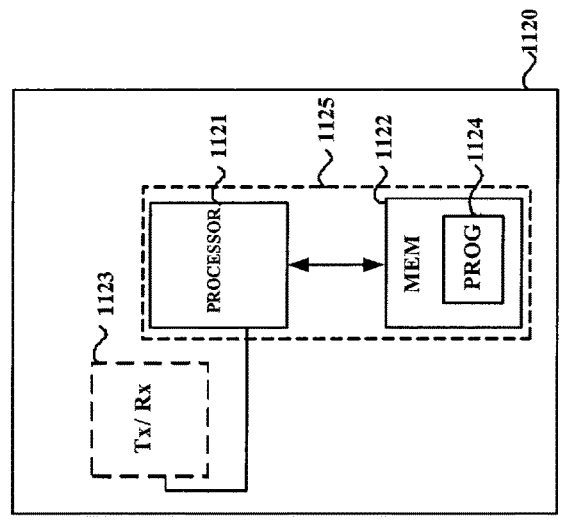
FIG. 11 illustrates a simplified block diagram of an apparatus that may be embodied as/in a network device, and an apparatus that may be embodied as/in a terminal device.
Figure 11:
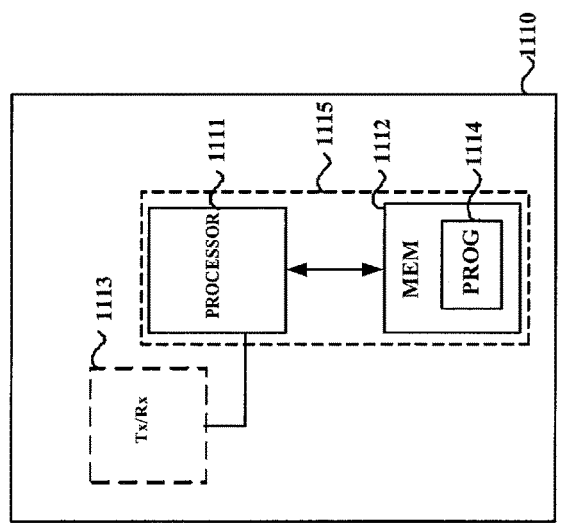

FIG. 11 illustrates a simplified block diagram of an apparatus 1110 that may be embodied in/as a terminal device, for example, the terminal device 102 shown in FIG. 1, and an apparatus 1120 that may be embodied in/as a network device, for example, the network devices 101 shown in FIG. 1.

Network device 101 comprises processing circuitry, device readable medium, interface, user interface equipment, auxiliary equipment, power source, power delivery circuitry, and antenna. These components are depicted as single boxes located within a single larger box, and in some cases contain additional boxes therein. In practice however, a network device may comprise multiple different physical components that make up a single illustrated component (e.g., interface comprises ports/terminals for coupling wires for a wired connection and radio front end circuitry for a wireless connection). As another example, network device may be a virtual network node. Similarly, network node may be composed of multiple physically separate components (e.g., a NodeB component and a RNC component, a BTS component and a BSC component, etc.), which may each have their own respective components. In certain scenarios in which network device comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node may be configured to support multiple radio access technologies (RATs). In such embodiments, some components may be duplicated (e.g., separate device readable medium for the different RATs) and some components may be reused (e.g., the same antenna may be shared by the RATs).

The apparatus 1110 may include one or more processors 1111, such as a data processor (DP) and one or more memories (MEM) 1112 coupled to the processor 1111. The apparatus 1110 may further include a transmitter TX and receiver RX 1113 coupled to the processor 1111. The MEM 1112 may be non-transitory machine readable storage medium and it may store a program (PROG) 1114. The PROG 1114 may include instructions that, when executed on the associated processor 1111, enable the apparatus 1110 to operate in accordance with the embodiments of the present disclosure, for example to perform the method 400. A combination of the one or more processors 1111 and the one or more MEMs 1112 may form processing means 1115 adapted to implement various embodiments of the present disclosure.

The apparatus 1120 includes one or more processors 1121, such as a DP, and one or more MEMs 1122 coupled to the processor 1121. The apparatus 1120 may further include a suitable TX/RX 1123 coupled to the processor 1121. The MEM 1122 may be non-transitory machine readable storage medium and it may store a PROG 1124. The PROG 1124 may include instructions that, when executed on the associated processor 1121, enable the apparatus 1120 to operate in accordance with the embodiments of the present disclosure, for example to perform the method 800. A combination of the one or more processors 1121 and the one or more MEMs 1122 may form processing means 1125 adapted to implement various embodiments of the present disclosure.

Various embodiments of the present disclosure may be implemented by computer program executable by one or more of the processors 1111 and 1121, software, firmware, hardware or in a combination thereof.

The MEMs 1112 and 1122 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 1111 and 1121 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (for example, procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method in a terminal device, comprising:
receiving a first indication of a first resource pool to be shared by a first service and a second service, a second indication of a second resource pool dedicated for the second service, and a third indication of a third resource pool dedicated for the first service;
receiving configuration information, the configuration information including a first configuration for transmitting data of the first service using a resource in the first resource pool, a second configuration for transmitting data of the second service using the resource in the first resource pool, the second configuration being different from the first configuration, a third configuration for transmitting data of the second service using a resource in the second resource pool, the third configuration being different from the second configuration, and a fourth configuration for transmitting data of the first service using a resource in the third resource pool, the fourth configuration being different from the first configuration; and
transmitting one or more of the data of the first service and the data of the second service based on the first indication, the second indication, and the third indication, and the first configuration, the second configuration, the third configuration, and the fourth configuration;
wherein one or more of the first configuration and the second configuration include one or more of:
a parameter for code division multiplexing, CDM;
a parameter for power control; and
a parameter for control channel configuration.

2. The method according to claim 1, wherein the first service requires one or more of lower delay and higher reliability than the second service.

3. The method according to claim 1, wherein one or more of the first configuration and the second configuration further include one or more of:
a parameter for reference signal, RS, configuration, and
a parameter for resource allocation.

4. The method according to claim 3, wherein the parameter for the CDM includes one or more of:
a group of orthogonal covering codes, and
a group of scrambling codes; or
wherein the parameter for RS configuration includes one or more of:
a group of cyclic shifts for the RS,
a code sequence for the RS,
a transmission pattern for the RS, and
an indication of number of antenna ports for the RS; or
wherein the parameter for power control includes one or more of:
a target received signal power,
a compensation factor for path loss, and
an indication of transmission power difference between the first service and the second service; or
wherein the first configuration indicates a first parameter for power control, and the second configuration indicates a second parameter for power control, the first parameter for power control resulting in a transmission power boost compared to the second parameter for power control.

5. The method according to claim 1, wherein the configuration information indicates a common RS pattern for data transmission of the first service and the second service.

6. The method according to claim 1, wherein the first configuration indicates a first RS pattern, the second configuration indicates a second RS pattern, the third configuration indicates a third RS pattern and the fourth configuration indicates a fourth RS pattern, the first RS pattern or the second RS pattern including one or more of:
RS included in the third RS pattern, and
RS included in the fourth RS pattern.

7. The method according to claim 1, further comprising:
determining a RS pattern for data transmission in the first resource pool based on a RS pattern indicated by the third configuration and a RS pattern indicated by the fourth configuration.

8. The method according to claim 1, further comprising:
receiving, using a resource in the second resource pool, a scheduling grant for data transmission of the first service or the second service using the resource in the first resource pool; and
wherein transmitting one or more of the data of the first service and the data of the second service comprises:
transmitting one or more of the data of the first service and the data of the second service further based on the received scheduling grant.

9. The method according to claim 1, wherein transmitting one or more of the data of the first service and the data of the second service comprises:
blanking data transmission in a resource element occupied by a RS for the first service or the second service in the first resource pool.

10. A method in a network device, comprising:
transmitting a first indication of a first resource pool to be shared by a first service and a second service, a second indication of a second resource pool dedicated for the second service, and a third indication of a third resource pool dedicated for the first service;
transmitting configuration information, the configuration information including a first configuration for transmitting data of the first service using a resource in the first resource pool, a second configuration for transmitting data of the second service using the resource in the first resource pool, the second configuration being different from the first configuration, a third configuration for transmitting data of the second service using a resource in the second resource pool, the third configuration being different from the second configuration, and a fourth configuration for transmitting data of the first service using a resource in the third resource pool, the fourth configuration being different from the first configuration; and
receiving one or more of the data of the first service and the data of the second service based on the first indication, the second indication, and the third indication, and the first configuration, the second configuration, the third configuration, and the fourth configuration;
wherein one or more of the first configuration and the second configuration include one or more of:
a parameter for code division multiplexing, CDM;
a parameter for power control; and
a parameter for control channel configuration.

11. The method according to claim 10, wherein the first service requires one or more of lower delay and higher reliability than the second service.

12. The method according to claim 10, wherein one or more of the first configuration and the second configuration further include one or more of:
    a parameter for reference signal, RS, configuration, and
    a parameter for resource allocation.

13. The method according to claim 12, wherein the parameter for the CDM includes one or more of:
    a group of orthogonal covering codes, and
    a group of scrambling codes; or
wherein the parameter for RS configuration includes one or more of:
    a group of cyclic shifts for the RS,
    a code sequence for the RS,
    a transmission pattern for the RS, and
    an indication of number of antenna ports for the RS; or
wherein the parameter for power control includes one or more of:
    a target received signal power,
    a compensation factor for path loss, and
    an indication of transmission power difference between the first service and the second service; or
wherein the first configuration indicates a first parameter for power control, and the second configuration indicates a second parameter for power control, the first parameter for power control resulting in a transmission power boost compared to the second parameter for power control.

14. The method according to claim 10, wherein the configuration information indicates a common RS pattern for data transmission of the first service and the second service.

15. The method according to claim 10, wherein the first configuration indicates a first RS pattern, the second configuration indicates a second RS pattern, the third configuration indicates a third RS pattern and the fourth configuration indicates a fourth RS pattern, the first RS pattern or the second RS pattern including one or more of:
    RS included in the third RS pattern, and
    RS included in the fourth RS pattern.

16. The method according to claim 10, further comprising:
    transmitting, using a resource in the second resource pool, a scheduling grant for data transmission of the first service or the second service using the resource in the first resource pool; and
    wherein receiving one or more of the data of the first service and the data of the second service comprises:
    receiving one or more of the data of the first service and the data of the second service further based on the received scheduling grant.

17. The method according to claim 10, wherein receiving the data of the first service and the data of the second service comprises:
    decoding the data of the first service firstly; and
    decoding the data of the second service based on decoding result of the data of the first service.

18. An apparatus in a terminal device, the apparatus comprising a processor and a memory, said memory containing instructions which, when executed by said processor, causes said apparatus to:
    receive a first indication of a first resource pool to be shared by a first service and a second service, a second indication of a second resource pool dedicated for the second service, and a third indication of a third resource pool dedicated for the first service;
    receive configuration information, the configuration information including a first configuration for transmitting data of the first service using a resource in the first resource pool a second configuration for transmitting data of the second service using the resource in the first resource pool, the second configuration being different from the first configuration, a third configuration for transmitting data of the second service using a resource in the second resource pool, the third configuration being different from the second configuration, and a fourth configuration for transmitting data of the first service using a resource in the third resource pool, the fourth configuration being different from the first configuration; and
    transmit one or more of the data of the first service and the data of the second service based on the first indication, the second indication, and the third indication, and the first configuration, the second configuration, the third configuration, and the fourth configuration;
    wherein one or more of the first configuration and the second configuration include one or more of:
    a parameter for code division multiplexing, CDM;
    a parameter for power control; and
    a parameter for control channel configuration.

19. The apparatus according to claim 18, wherein the first service requires one or more of lower delay and higher reliability than the second service.

20. The apparatus according to claim 18, wherein one or more of the first configuration and the second configuration further include one or more of:
    a parameter for reference signal, RS, configuration, and
    a parameter for resource allocation.

21. The apparatus according to claim 20, wherein the parameter for the CDM includes one or more of:
    a group of orthogonal covering codes, and
    a group of scrambling codes; or
wherein the parameter for RS configuration includes one or more of:
    a group of cyclic shifts for the RS,
    a code sequence for the RS,
    a transmission pattern for the RS, and
    an indication of number of antenna ports for the RS; or
wherein the parameter for power control includes one or more of:
    a target received signal power,
    a compensation factor for path loss, and
    an indication of transmission power difference between the first service and the second service; or
wherein the first configuration indicates a first parameter for power control, and the second configuration indicates a second parameter for power control, the first parameter for power control resulting in a transmission power boost compared to the second parameter for power control.

22. The apparatus according to claim 18, wherein the configuration information indicates a common RS pattern for data transmission of the first service and the second service.

23. The apparatus according to claim 18, wherein the first configuration indicates a first RS pattern, the second configuration indicates a second RS pattern, the third configuration indicates a third RS pattern and the fourth configuration indicates a fourth RS pattern, the first RS pattern or the second RS pattern including one or more of:
    RS included in the third RS pattern, and
    RS included in the fourth RS pattern.

24. The apparatus according to claim 18, wherein said memory contains instructions executable by said processor whereby said apparatus is further operative to:
   determine a RS pattern for data transmission in the first resource pool based on a RS pattern indicated by the third configuration and a RS pattern indicated by the fourth configuration.

25. The apparatus according to claim 18, wherein said memory contains instructions executable by said processor whereby said apparatus is further operative to:
   receive, using a resource in the second resource pool, a scheduling grant for data transmission of the first service or the second service using the resource in the first resource pool; and
   transmit one or more of the data of the first service and the data of the second service by transmitting one or more of the data of the first service and the data of the second service further based on the received scheduling grant.

26. The apparatus according to claim 18, wherein said memory contains instructions executable by said processor whereby said apparatus is further operative to transmit one or more of the data of the first service and the data of the second service by:
   blanking data transmission in a resource element occupied by a RS for the first service or the second service in the first resource pool.

27. An apparatus in a network device, the apparatus comprising a processor and a memory, said memory containing instructions which, when executed by said processor, causes said apparatus to:
   transmit a first indication of a first resource pool to be shared by a first service and a second service, a second indication of a second resource pool dedicated for the second service, and a third indication of a third resource pool dedicated for the first service;
   transmit configuration information, the configuration information including a first configuration for transmitting data of the first service using a resource in the first resource pool a second configuration for transmitting data of the second service using the resource in the first resource pool, the second configuration being different from the first configuration, a third configuration for transmitting data of the second service using a resource in the second resource pool, the third configuration being different from the second configuration, and a fourth configuration for transmitting data of the first service using a resource in the third resource pool, the fourth configuration being different from the first configuration; and
   receive one or more of the data of the first service and the data of the second service based on the first indication, the second indication, and the third indication, and the first configuration, the second configuration, the third configuration, and the fourth configuration;
   wherein one or more of the first configuration and the second configuration include one or more of:
   a parameter for code division multiplexing, CDM;
   a parameter for power control; and
   a parameter for control channel configuration.

28. The apparatus according to claim 27, wherein the first service requires one or more of lower delay and higher reliability than the second service.

29. The apparatus according to claim 27, wherein one or more of the first configuration and the second configuration further include one or more of:
   a parameter for reference signal, RS, configuration, and
   a parameter for resource allocation.

30. The apparatus according to claim 29, wherein the parameter for the CDM includes one or more of:
   a group of orthogonal covering codes, and
   a group of scrambling codes; or
wherein the parameter for RS configuration includes one or more of:
   a group of cyclic shifts for the RS,
   a code sequence for the RS,
   a transmission pattern for the RS, and
   an indication of number of antenna ports for the RS; or
wherein the parameter for power control includes one or more of:
   a target received signal power,
   a compensation factor for path loss, and
   an indication of transmission power difference between the first service and the second service; or
wherein the first configuration indicates a first parameter for power control, and the second configuration indicates a second parameter for power control, the first parameter for power control resulting in a transmission power boost compared to the second parameter for power control.

31. The apparatus according to claim 27, wherein the configuration information indicates a common RS pattern for data transmission of the first service and the second service.

32. The apparatus according to claim 27, wherein the first configuration indicates a first RS pattern, the second configuration indicates a second RS pattern, the third configuration indicates a third RS pattern and the fourth configuration indicates a fourth RS pattern, the first RS pattern or the second RS pattern including one or more of:
   RS included in the third RS pattern, and
   RS included in the fourth RS pattern.

33. The apparatus according to claim 27, wherein said memory contains instructions executable by said processor whereby said apparatus is further operative to:
   transmit, using a resource in the second resource pool, a scheduling grant for data transmission of the first service or the second service using the resource in the first resource pool; and
   and receive one or more of the data of the first service and the data of the second service by receiving one or more of the data of the first service and the data of the second service further based on the received scheduling grant.

34. The apparatus according to claim 27, wherein said memory contains instructions executable by said processor whereby said apparatus is further operative to receive the data of the first service and the data of the second service by:
   decoding the data of the first service firstly; and
   decoding the data of the second service based on decoding result of the data of the first service.

* * * * *